United States Patent Office 3,153,083
Patented Oct. 13, 1964

3,153,083
PROCESS FOR THE PRODUCTION OF CARBONYL GROUPS IN ORGANIC COMPOUNDS
Jürgen Smidt, Munich-Solln, Rolf Sieber, Munich-Forstenried, Walter Hafner, Munich, and Reinhard Jira, Munich-Pasing, Germany, assignors to Consortium für Elektrochemische Industrie G.m.b.H., Munich, Germany
No Drawing. Filed Sept. 3, 1958, Ser. No. 758,661
Claims priority, application Germany Sept. 6, 1957
15 Claims. (Cl. 260—465.1)

The present invention relates to a process for the production of carbonyl groups in organic compounds containing one or more olefinically unsaturated double bonds and one or more heteroatoms, that is, atoms other than carbon and hydrogen.

It is known that olefinic C=C— double bonds can be converted oxidatively by various reactions. For example, two hydroxyl groups can be introduced with potassium permanganate or osmiumtetroxide in the presence of water to produce diols. When lead tetracetate is used two acetoxy groups are introduced which secondarily can be saponified to hydroxyl groups. It is furthermore known that compounds containing olefinic C=C— double bonds can be converted to olefine oxides with the aid of elemental oxygen in the presence of silver catalysts or with percarboxylic acids. By hydrolysis and oxidation, such oxidation products can be converted to carbonyl compounds containing aldehyde or keto groups in place of the olefinic double bonds previously contained in such compounds.

In a similar manner, an olefinic C=C— double bond can be converted to a keto or aldehyde group, for example, by an addition reaction with acids, saponification of the resulting ester and subsequent oxidation of the resulting hydroxy group.

All of these processes require several reaction steps and close control of the reaction conditions. Furthermore, they are often subject to strong side reactions.

In co-pending applications Serial No. 738,040, filed December 27, 1957, now abandoned, and Serial No. 744,011, filed June 23, 1958, now Patent No. 3,080,425, processes are described for the production of carbonyl compounds from olefinically unsaturated hydrocarbons in which such hydrocarbons are converted with aqueous solutions of platinum group metal compounds. Such conversion also can be carried out in the presence of oxidizing agents.

According to the present invention it was found that such organic compounds which in addition to one or more olefinically unsaturated double bonds also contains one or more heteroatoms (atoms other than carbon and hydrogen) can be reacted in a similar manner to produce carbonyl compounds with the aid of aqueous solutions of platinum group metal compounds. In the following, the simple reference to platinum metal compounds is employed to refer to the platinum group metal compounds. Starting materials for the process according to the invention, for example, are olefinically unsaturated compounds containing oxygen, sulfur, halogens, nitrogen or silicon as heteroatoms. The type of linkage in which the heteroatoms are present has no influence upon the course of the reaction. Oxygen, for example, can be present in the form of carbonyl, hydroxyl, ether, ester or carboxyl groups. Nitrogen, in addition to being bonded to carbon, can be bonded to hydrogen or oxygen. Silicon can be bonded directly to the organic portion of the compound or over oxygen. Of course, the starting compounds employed according to the invention can contain several different heteroatoms.

In the process according to the invention the olefinically unsaturated C=C— double bonds of aliphatic, aromatic or cyclic compounds containing one or more heteroatoms can be converted to aldehyde or ketone groups without splitting of the molecule at such location. When unstable carbonyl products are produced, the known secondary products are obtained. For example, in the introduction of a keto group in beta position to a carboxyl group, a decarboxylation readily takes place. The reaction according to the invention often will take place at ordinary room temperatures. However, it is expedient to employ temperatures between 30° C. and the boiling point of the reaction mixture. With the use of elevated pressures, temperatures up to 250° C. can be employed. The reaction period required depends upon the starting compound and can vary from several minutes to a number of hours.

The process according to the invention can be carried out in a number of ways. The starting materials can be treated with aqueous solutions which only contain platinum metal compounds. It is, however, more economical to employ solutions which in addition to small quantities of platinum metal compounds contain oxidizing agents in higher concentration.

The platinum metal compounds are catalytically active, particularly, those of palladium and rhodium. The type of the non-metallic component of such compounds is only of secondary importance as long as extremely strong complex formers, such as cyanide ions, or precipitating agents, such as sulfide ions, are not concerned. Usable platinum metal compounds, for example, are the halides, sulfates, phosphates, acetates and corresponding complexes.

When oxidizing agents are employed in conjunction with the platinum metal compounds, their function is to compensate for or hinder a reduction of the platinum metal compounds by the unsaturated organic compounds. As a consequence, the oxidation potential of the oxidizing agents employed should be above that of the active platinum metal compounds. The oxidation potential can be ascertained in a known manner by electrical measurements. As a criterion, the tabulated values of normal potential can be used.

NORMAL POTENTIALS OF OXIDIZING AGENTS

[$E_n$ in volts]

| | | | | | |
|---|---|---|---|---|---|
| $ClO_3^- \rightarrow Cl^-$ | 1.45 | $Fe^{3+} \rightarrow Fe^{2+}$ | 0.77 | $O_3 \rightarrow O_2$ | 2.07 |
| $Cr_2O_7^{2-} \rightarrow Cr^{3+}$ | 1.36 | $Hg^{2+} \rightarrow Hg^+$ | 0.91 | $PbO_2 \rightarrow Pb^{2+}$ | 1.47 |
| $BrO_3^- \rightarrow Br^-$ | 1.44 | $IO_3^- \rightarrow I^-$ | 1.09 | $MnO_2 \rightarrow Mn^{2+}$ | 1.28 |
| $Cu^{2+} \rightarrow CuCl_2^-$ | 0.46 | $O_2 \rightarrow H_2O$ | 1.23 | $IO_6H_4^- \rightarrow I^-$ | 1.40 |

(See Angew. Chemie 62, 319.)

The selection of the suited oxidizing agent depends upon the manner in which the reaction is to be carried out. In discontinuous processes the persulfates, oxygen acids of halogens or their salts, chromates and other oxometallates can be employed.

If the reaction is carried out in the presence of oxygen or if the catalyst solution is to be regenerated periodically after separation from the reaction products and in the absence of organic starting compounds by treatment with oxygen or with oxygen in combination with nitrogen-oxygen compounds, it is advantageous to use salts of multivalent metals, especially of iron or copper, as the oxidizing agent.

The oxidizing agents insofar as they are soluble are employed together with the platinum metal compounds in aqueous solution. Preferably the platinum metal compounds are employed in concentrations of 2 to 20 g. per liter and the oxidizing agent in higher concentrations. When salts of multivalent metals are employed, a molar ratio of platinum metal to multivalent metal of up to 1:100 and above can be employed. Halogen ions retard the reduction of solution but, on the other hand, promote the oxidation with oxygen. Consequently, when the reaction is carried out with the use of oxygen and salts of multivalent metals, the reaction can be controlled by the addition of halides, particularly chlorides. Preferably, a halogen ion concentration is maintained which is 60 to 90% of the quantity which would be contained in the solution if all metals were present as halides in their highest stable oxidation step.

The reaction is carried out in acid to neutral solution. A pH of 0 to 2 is preferred.

If the process is carried out with regeneration of the catalyst solution with oxygen and nitrogen-oxygen compounds, it is advantageous to employ sulfate containing catalyst solutions. Ferric sulfate is preferred. Nitrogen oxides and nitric acid are suited nitrogen-oxygen compounds. It is especially advantageous if an excess of oxidizing nitrogen-oxygen compound, with reference to reduced portions of the catalyst solution in the part of the catalyst solution being reoxidized, is maintained in the oxygen and nitrogen-oxygen compound mixture employed for the reoxidation.

In order to attain usable oxidation efficiencies, it is neither necessary to employ especially high concentrations of nitrogen-oxygen compounds or to employ stoichiometric quantities of the nitrogen-oxygen compounds with reference to the reduced portions of the entire catalyst solution. It is only essential that the nitrogen-oxygen compounds are always present in the portion of the catalyst solution being reoxidized in excess of the reduced portions contained in such portion of catalyst solution. This, for example, can be achieved by adjusting the velocity at which the catalyst solution is supplied to the action of oxygen and nitrogen-oxygen compounds to a velocity corresponding to the progress of the oxidation. The continuous presence of sufficient quantities of oxygen has the effect of maintaining the original quantity of oxidizing nitrogen-oxygen compounds supplied by continuous reformation of such nitrogen-oxygen compounds during the reaction. It is therefore possible in view of this constant regeneration of the nitrogen-oxygen compound to carry out the regeneration of the catalyst solution with a quantity of nitrogen-oxygen compounds which is considerably less than the stoichiometric quantity required for reoxidation of all of the reduced portions of the catalyst solution taken as a whole over a period of time provided suitable adjustment of the rate of supply of the used catalyst solution to the action of the oxygen and nitrogen-oxygen compounds is maintained. Even when working under such conditions the reoxidation is rapid and complete.

The treatment of the used catalyst solution with the oxygen and nitrogen-oxygen compounds can take place at ordinary room temperatures. It is, however, preferable to employ elevated temperatures, for example, in the range of 50 to 170° C. The pressures employed are selected with regard to the temperatures used. Pressures of, for example, 1 to 50 atmospheres can be used.

The reoxidized catalyst solution is then admixed with a small excess of a further quantity of used catalyst solution with respect to the quantity of nitric acid or nitrogen-oxygen compounds still contained therein and passed through a filled tower and treated with air or steam to free it from nitrogen oxides before being reused as the catalyst for the production of carbonyl compounds.

The process according to the invention involves a reaction between phases of only limited miscibility. As a consequence, all measures which provide for intensive intimate contact of the phases or increase the miscibility of the phases promote the reaction. Intensive contact can be attained by mechanical measures such as stirring, shaking, vibrating, spraying and the like and chemical measures which favor the formation of large surfaces. In order to increase the miscibility, blending agents such as acetic acid or dioxane can be added. The solubility of gaseous reactants can be increased by employing superatmospheric pressures. The process according to the invention can be carried out at any desired pressure, preferably, however, a pressure within the range of 1 to 50 atmospheres is employed.

The time during which the unsaturated organic compounds and the reaction products are in contact with the aqueous catalyst solution can amount from a few minutes to several hours. The time of contact depends upon reactivity of starting unsaturated compounds, the composition of the catalyst solution, the pressure and temperature, as well as the type of oxidizing agent employed. The lower strongly polar unsaturated organic compounds react relatively rapidly, whereas the higher less polar or non-polar compounds require longer reaction times. Palladium compounds act very quickly, whereas the compounds of the other platinum metals are considerably slower in their action. The influence of halogen ions has already been mentioned. Increases in pressure and temperature accelerate the reaction. An upper limit for the time of contact is provided in the case of easily oxidizable and acid sensitive carbonyl compounds, especially when higher temperatures are employed and when strong oxidizing agents are employed. The permissible periods of contact can easily be determined for each individual case by determining the yields obtained.

The process according to the invention can be carried out in all apparatus for reacting gases, liquids or solids with each other, such as, for example, trickle or spray towers, filled columns, stirring vessels and the like. Naturally, the portions of such apparatus coming into contact with the strong oxidizing acid solutions must be of corrosion resistant material. Suitable corrosion resistant materials, for example, are enamel, glass, porcelain, stoneware, synthetic resins, rubber, titanium, tantalum and Hastelloy.

The reaction products produced can be recovered in various ways. Easily volatilized compounds, insofar as they are carried out with the non-converted gas stream, can be separated out by condensation or scrubbing. The compounds retained in the catalyst solution can be recovered by distillation. Difficultly volatile compounds can be recovered by liquid-liquid extraction, separation or filtration.

The following examples will serve to illustrate a number of embodiments of the process according to the invention.

EXAMPLE 1

106.7 g. of metallic palladium were dissolved in aqua regia and this solution evaporated to dryness on a sand bath. The residue was taken up in 200 cc. of 20% HCl and evaporated to dryness again. This latter procedure was repeated three times. A sufficient quantity of 1 n HCl was added to the resulting nitrate free residue so that upon warming complete solution was affected. After the solution cooled a sufficient quantity of water was added to provide 5.335 liters of solution and a small quantity of HCl was added so that the solution contained 21 mg. HCl per cc. of solution. The resulting solution contained 20 mg. of palladium per cc. and was used in the following examples.

0.1 mol anethol (4-methoxy-1-propenyl-benzol) was shaken together with 533 cc. of this palladium chloride solution (=0.1 mol palladium) for 4½ hours at 70° C. p-Methoxyphenyl acetone was obtained as the reaction product in 91% of the theoretical yield with a 55% conversion. The melting point and the mixed melting point of the 2,4-dinitrophenylhydrazone thereof was 105° C. (=DNP hydrazone).

EXAMPLE 2

0.1 mol of crotonaldehyde was mixed with 533 cc. of a palladium chloride solution (=0.1 mol palladium) prepared as in Example 1 and the mixture allowed to stand for 3 hours at 25° C. Acetyl acetaldehyde was formed as the reaction product which immediately cyclized to 1,3,5-triacetylbenzol. The yield of triacetylbenzol was 85% of the theoretical with a 35% conversion. The melting point and mixed melting point of the triacetylbenzol was 163° C.

EXAMPLE 3

0.1 mol of the unsaturated carboxylic acids tested in the following table were each mixed with 533 cc. of a palladium chloride solution prepared as in Example 1 and shaken for the period and at the temperature indicated in the table.

*Table*

| Starting Material | Temp., °C. | React. Per. | Product | Conversion, percent | Yield, percent d. Th. |
|---|---|---|---|---|---|
| Acrylic acid<br>$CH_2=CH-COOH$ | 50 | 180 | Acetaldehyde<br>$CH_3-CHO$<br>DNP, M.P. 166° | 50 | 93 |
| Crotonic acid<br>$CH_3-CH=CH-COOH$ | 50 | 60 | Acetone<br>$CH_3-CO-CH_3$<br>DNP, M.P. 126° | 25 | 91 |
| Methacrylic acid<br>$CH_2=C-COOH$<br>$\quad\;\; \mid$<br>$\quad\;\; CH_3$ | 40 | 120 | Propionaldehyde<br>$CH_3-CH_2-CHO$<br>DNP, M.P. 147° | 61 | 90 |
| Cinnamic acid<br>$C_6H_5-CH=CH-COOH$ | 50 | 600 | Acetophenone<br>$C_6H_5-CO-CH_3$<br>DNP, M.P. 244° | 35 | 92 |
| Maleic acid<br>$HOOC-CH=CH-COOH$ | 50 | 180 | Pyruvic acid<br>$CH_3-CO-COOH$<br>DNP, M.P. 217° | 25 | 91 |
| Tiglic acid<br>$CH_3-CH=C-COOH$<br>$\qquad\qquad\;\;\; \mid$<br>$\qquad\qquad\;\;\; CH_3$ | 50 | 120 | Methylethylketone<br>$CH_3-CO-CH_2-CH_3$<br>DNP, M.P. 110° | 40 | 95 |
| Itaconic acid<br>$HOOC-CH_2-C-COOH$<br>$\qquad\qquad\;\;\; \parallel$<br>$\qquad\qquad\;\;\; CH_2$ | 50 | 60 | Succinic aldehyde acid<br>$OCH-CH_2-CH_2-COOH$<br>DNP, M.P. 207° | 30 | 90 |
| Sorbic acid<br>$CH_3-(CH=CH)_2-COOH$ | 65 | 15 | Ethylidene acetone<br>$CH_3-CH=CH-CO-CH_3$<br>DNP, M.P. 156° | 35 | 92 |

EXAMPLE 4

0.04 mol of cinnamic acid was mixed with 107 cc. of a palladium chloride solution prepared as in Example 1 (=0.02 mol palladium) to which 0.02 mol of ferric sulfate had been added and the mixture shaken for 6 hours at 70° C. The test was repeated using double the quantity of palladium chloride solution (=0.04 mol palladium) in the absence of ferric sulfate. When the iron compound containing solution was employed, the conversion was 68% producing a yield of acetophenone which was 92% of the theoretical. In the absence of the iron compound the conversion was 70% and the yield 90% of the theoretical.

EXAMPLE 5

0.04 mol of cinnamic acid was mixed with 54 cc. of a palladium chloride solution prepared as in Example 1 to which 0.03 mol of ferric sulfate had been added and the mixture shaken for six hours at 70° C. in the absence of oxygen. The test was repeated but the mixture in this case was shaken in the presence of oxygen. In the absence of oxygen the conversion was 36% with a 91% of the theoretical yield of acetophenone. In the presence of oxygen the conversion was 50% and the yield 95% of the theoretical.

EXAMPLE 6

0.1 mol of cinnamic acid ethyl ester was mixed with 533 cc. of a palladium chloride solution prepared as in Example 1 to which 100 cc. of dioxane had been added and the mixture shaken for 5 hours at 70° C. A conversion of 66% with a yield 91% of the theoretical of acetophenone was obtained.

EXAMPLE 7

15.5 g. of rhodium-(III)-hydroxide (=0.1 mol rhodium) were dissolved in 200 cc. of 1 n HCl. Sufficient water was added to provide 500 cc. of solution. 0.1 mol of cinnamic acid was added to this solution and the mixture was shaken for 14 hours at 70° C. Acetophenone was obtained in a yield 85% of the theoretical.

EXAMPLE 8

0.03 mol of 3-chloro-2-methyl-propene-(1) was mixed with 170 cc. of a palladium chloride solution (=0.03 mol palladium) prepared as in Example 1 and the mixture shaken for 1 hour at 50° C. Alpha methyl acrolein was obtained as the reaction product in a yield of 85% of the theoretical. The melting point and mixed melting point of the DNP hydrazone thereof was 198° C. (Z).

EXAMPLE 9

0.03 mol of 1-chloro-2-methyl-propene-(1) was mixed with 170 cc. of a palladium chloride solution (=0.03 mol palladium) prepared as in Example 1 and the mixture shaken for 40 minutes at 40° C. Alpha methyl acrolein in a yield of 62% of the theoretical and isobutyraldehyde in a yield of 15% of the theoretical were obtained as reaction products. The melting point and mixed melting point of the DNP hydrazone of the alpha methyl acrolein was 198° C. (Z) and that of the DNP hydrazone of the isobutyraldehyde was 183° C.

EXAMPLE 10

0.03 mol of alpha chlorostyrene was mixed with 170 cc. of a palladium chloride solution (=0.03 mol palladium) prepared as in Example 1 and the mixture shaken for 30 minutes at 40° C. Acetophenone was obtained as the reaction product in a yield of 88% of the theoretical. The melting point and mixed melting point of the DNP hydrazone thereof was 273° C.

EXAMPLE 11

270 cc. of a palladium chloride solution (=0.05 mol palladium) prepared as in Example 1 were shaken together with 0.03 mol of each of allylchloride, allylbromide and 2,3-dibromopropene-(1) for 30 minutes in the case of the first two compounds and for 2 hours in the case of the last compound at 50° C. In each instance methyl glyoxal was the reaction product. The yields were as follows: from allylchloride 65% of the theoretical; from allylbromide 80% of the theoretical and from 2,3-dibromopropene-(1) 85% of the theoretical.

EXAMPLE 12

0.03 mol alpha-methyl acrylic acid amide was shaken together with 170 cc. of a palladium chloride solution (=0.03 mol palladium) prepared as in Example 1 for 2 hours at 50° C. Propionaldehyde was obtained as the reaction product in a yield of 72% of the theoretical. The melting point and mixed melting point of the DNP hydrazone thereof was 151° C.

EXAMPLE 13

0.03 mol of acrylonitrile was shaken with 170 cc. of a palladium chloride solution (=0.03 mol palladium) prepared as in Example 1 for 15 minutes at 20° C. Pyruvic acid nitrile was obtained as the reaction product in a yield of 90% of the theoretical. The melting point and mixed melting point of the DNP hydrazone thereof was 177° C.

EXAMPLE 14

0.03 mol of allylalcohol was shaken with 170 cc. of a palladium chloride solution (=0.03 mol palladium) for 5 minutes at 25° C. Acrolein was obtained as the reaction product in a yield of 75% of the theoretical. The melting point and mixed melting point of the DNP hydrazone thereof was 164° C. (Z).

EXAMPLE 15

0.03 mol of p-methoxystyrene was shaken with 170 cc. of a palladium chloride solution (=0.03 mol palladium) as prepared in Example 1 for 10 minutes at 20° C. In addition to polymerized starting material, p-methoxy-acetophenone was obtained in a yield of 45% of the theoretical. The melting point and mixed melting point of the DNP hydrazone thereof was 217° C.

Analogously a number of other unsaturated organic compounds were reacted with an aqueous palladium chloride solution prepared as in Example 1. The results are given in the following table.

We claim:
1. A process for the treatment of a compound containing at least one olefinically unsaturated bond and consisting of the atoms of hydrogen and carbon and at least one heteroatom selected from the group consisting of oxygen, sulfur, chlorine, bromine and nitrogen, said heteroatom being in an acyclic linkage, to form a different compound containing a carbonyl group selected from the group consisting of aldehyde and keto carbonyl groups which comprises intimately contacting said compound containing at least one olefinically unsaturated bond with an aqueous solution of a platinum group metal salt at a temperature of above 0° C. to about 250° C.
2. The process of claim 1 in which said compound containing at least one olefinically unsaturated bond contains at least one oxygen atom in the form of a carbonyl group.
3. The process of claim 1 in which said compound containing at least one olefinically unsaturated bond contains at least one oxygen atom in the form of a hydroxyl group.
4. The process of claim 1 in which said compound containing at least one olefinically unsaturated bond contains at least one oxygen atom in the form of an ether group.
5. The process of claim 1 in which said compound containing at least one olefinically unsaturated bond contains at least one oxygen atom in the form of a carboxyl group.
6. The process of claim 1 in which said compound containing at least one olefinically unsaturated bond contains at least one nitrogen atom, in the form of an amino group, bonded to a carbon atom of such compound.
7. The process of claim 1 in which said compound containing at least one olefinically unsaturated bond contains at least one nitrogen atom, in the form of a nitro group, bonded to a carbon atom of such compound.
8. The process of claim 1 in which said salt is a palladium salt.
9. The process of claim 1 in which said salt is a rhodium salt.
10. The process of claim 1 in which said compound is

Table

| Starting Material | Reaction Temperature, ° C. | Reaction Time, Minutes | Reaction Product | Conversion | Yield, Percent |
|---|---|---|---|---|---|
| Iso-Safrol | 70 | 120 | 3,4-dioxymethylenebenzylmethylketone | 69 | 91 |
| α,β-Pentenoic acid | 35 | 45 | Ethylmethylketone | 88 | 92 |
| α,β-Hexenoic acid | 35 | 70 | n-Propylmethylketone | 94 | 95 |
| α,β-Heptenoic acid | 50 | 50 | n-Butylmethylketone | 86 | 91 |
| α,β-Octenoic acid | 50 | 60 | n-Amylmethylketone | 95 | 95 |
| α-Methoxy-crotonic acid | 50 | 120 | Acetone | 82 | 90 |
| Vinylbromide | 10 | 15 | Acetaldehyde | 98 | 98 |
| 1-bromo-propene-1 | 30 | 15 | Acetone | 65 | 91 |
| 1-bromo-butene-1 | 30 | 15 | Ethylmethylketone | 67 | 95 |
| 1-bromo-pentene-1 | 50 | 15 | n-Propylmethylketone | 61 | 92 |
| 1-bromo-hexene-1 | 50 | 45 | n-Butylmethylketone | 88 | 95 |
| 1-bromo-heptene-1 | 50 | 45 | n-Amylmethylketone | 85 | 91 |
| β-Bromostyrene | 40 | 20 | Acetophenone / Acetaldehyde | 60 | 80 / 10 |
| 2-chloropropene-1 | 20 | 120 | Acetone | 32 | 88 |
| α-Chloro-β-methylstyrene | 70 | 120 | Propiophenone | 47 | 91 |
| 2-chloro-3-phenylpropene-1 | 70 | ¹10 | Benzylmethylketone | 25 | 92 |
| 2-chloro-1-phenylpropene-1 | 70 | ¹10 | Benzylmethylketone | 22 | 92 |
| 1-bromopentene-4 | 25 | 30 | p-Bromopropylmethylketone | 53 | 94 |
| p-Chlorostyrene | 30 | 30 | p-Chloroacetophenone | 36 | 91 |
| 1,3-dichloropropene-1 | 50 | ¹6 | Methylglyoxal | 32 | 94 |
| α-Bromoacrylic acid | 25 | 60 | Acetaldehyde | 60 | 92 |
| α-Chlorocrotonic acid | 50 | 60 | Acetone | 76 | 95 |
| α-Bromo-α,β-pentenoic acid | 50 | 60 | Ethylmethylketone | 62 | 93 |
| α-Bromo-α,β-hexenoic acid | 50 | 60 | n-Propylmethylketone | 57 | 94 |
| α-Bromo-α,β-heptenoic acid | 50 | 60 | n-Butylmethylketone | 70 | 91 |
| α-Bromo-α,β-octenoic acid | 50 | 60 | n-Amylmethylketone | 65 | 91 |
| α-Bromocinnamic acid | 70 | 60 | Acetophenone | 64 | 92 |
| p-Chlorocinnamic acid | 70 | ¹9 | p-Chloroacetophenone | 25 | 90 |
| Methacrylicacidamide | 50 | 30 | Propionaldehyde | 72 | 92 |
| Crotonicacidamide | 50 | 30 | Acetone | 80 | 91 |
| α,β-Pentenoic acid amide | 50 | 30 | Ethylmethylketone | 71 | 92 |
| Cinnamic acid amide | 50 | 80 | Acetophenone | 48 | 91 |
| m-Nitrostyrene | 50 | 120 | m-Nitroacetophenone | 35 | 91 |
| m-Nitrocinnamic acid amide | 70 | 300 | m-Nitro acetophenone | 38 | 91 |
| Allyl amine | 25 | 15 | Propionaldehyde | 25 | 88 |
| Methyl-[buten-(1)-yl-(4)]-sulphone | 50 | 120 | Methyl-[butenon-(2)-yl-(4)]-sulphone | 54 | 92 |

¹ Hours.

intimately contacted with said aqueous salt solution in the presence of oxygen.

11. The process of claim 1 in which said compound is intimately contacted with said aqueous salt solution in the presence of an inert solvent.

12. The process of claim 1 in which said aqueous salt solution has a pH between 0 and 2.

13. A process for the treatment of a compound containing at least one olefinically unsaturated bond and consisting of the atoms of hydrogen and carbon and at least one heteroatom selected from the group consisting of oxygen, sulfur, chlorine, bromine and nitrogen, said heteroatom being in an acyclic linkage, to form a different compound containing a carbonyl group selected from the group consisting of aldehyde and keto carbonyl groups which comprises intimately contacting said compound containing at least one olefinically unsaturated bond with an aqueous solution of a platinum group metal salt and an oxidizing agent having an oxidation potential above that of the platinum group metal salt selected from the group consisting of water soluble copper and iron salts at a temperature of above 0° C. to about 250° C.

14. The process of claim 13 in which the quantity of the first mentioned salt in the aqueous solution is 2 to 20 grams per liter of solution and the concentration of the oxidizing agent in such solution is greater than that of the first mentioned salt.

15. The process of claim 13 in which said oxidizing agent is a ferric salt.

References Cited in the file of this patent

UNITED STATES PATENTS

| | | |
|---|---|---|
| 1,999,620 | Van Peski et al. | Apr. 30, 1935 |
| 2,354,512 | Finch et al. | July 25, 1944 |
| 2,523,686 | Engel | Sept. 26, 1950 |

FOREIGN PATENTS

| | | |
|---|---|---|
| 767,409 | Great Britain | Feb. 6, 1957 |
| 713,791 | Germany | Nov. 14, 1941 |
| 891,209 | France | Nov. 29, 1943 |

OTHER REFERENCES

Phillips: Amer. Chem. Jour., volume 16, pages 255–77 (pages 261 and 265–72 relied upon) (1894).

Chatt: Chem. Abstracts, volume 48, page 5067 (1954).